United States Patent [19]
Johnson et al.

[11] Patent Number: 5,907,742
[45] Date of Patent: May 25, 1999

[54] LAMP CONTROL SCHEME FOR RAPID WARMUP OF FLUORESCENT LAMP IN OFFICE EQUIPMENT

[75] Inventors: Craig T. Johnson; Gary W. Gragg; Jeffrey A. Sunamoto, all of San Diego; Stephen B. Witte, Poway, all of Calif.

[73] Assignee: Hewlett-Packard Company, Palo Alto, Calif.

[21] Appl. No.: 08/815,289

[22] Filed: Mar. 9, 1997

[51] Int. Cl.⁶ .................................................. G03G 15/043
[52] U.S. Cl. ................................................ 399/51; 355/69
[58] Field of Search ............................... 399/51, 32, 118, 399/177, 220; 355/68, 69

[56] References Cited

U.S. PATENT DOCUMENTS

| 4,982,232 | 1/1991 | Naito ........................................... 399/51 |
| 4,992,829 | 2/1991 | Sander et al. ............................... 399/32 |
| 5,336,976 | 8/1994 | Webb et al. ............................. 399/32 X |

*Primary Examiner*—S. Lee

[57] ABSTRACT

A lamp control scheme for rapid warmup of a cold cathode fluorescent lamp, to minimize the warmup time while maintaining long lamp service light. The lamp is over-driven with high current for up to a predetermined time limit to accelerate mercury vaporization. The drive current is then reduced to a normal level. The scanner light output is monitored by a sensor circuit, and the system waits until the light output exceeds a minimum output and the light profile is sufficiently stable. The scanner is then calibrated to a white reference, and the closed loop control of the signal level is activated. The scan or copy process is now performed, and the light level control is deactivated as needed. Thereafter, between uses the lower lamp current is 40% of normal level to keep the lamp warm while extending the life of the product. If the product has not been used in a long time, the lamp is turned off.

20 Claims, 9 Drawing Sheets

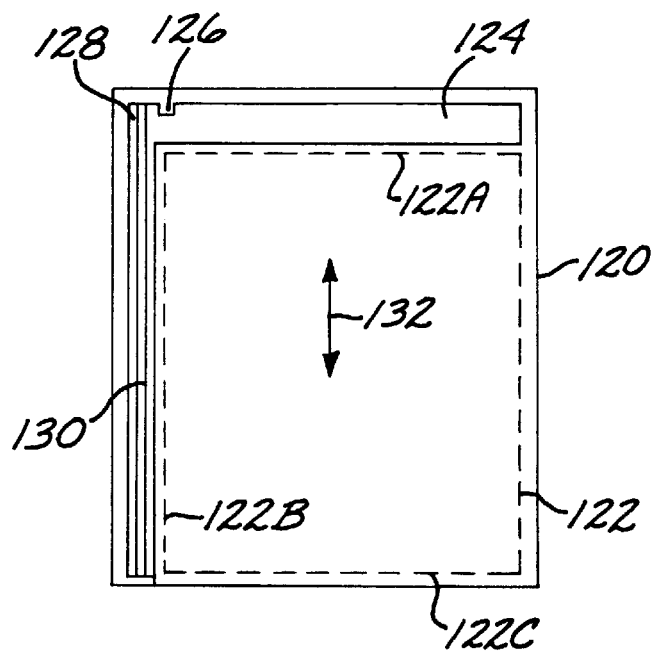
FIG.2A
FIG.2B
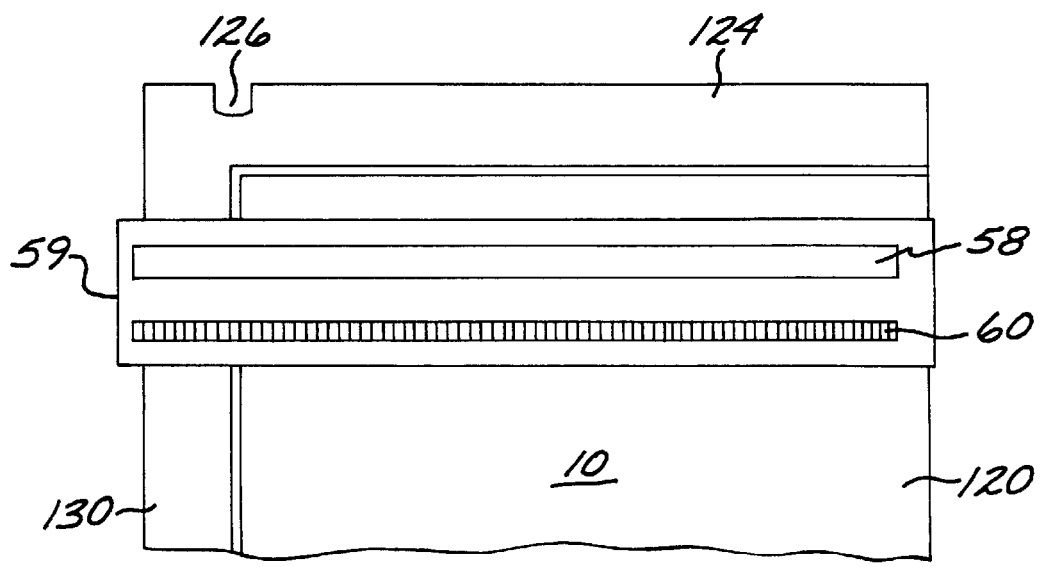

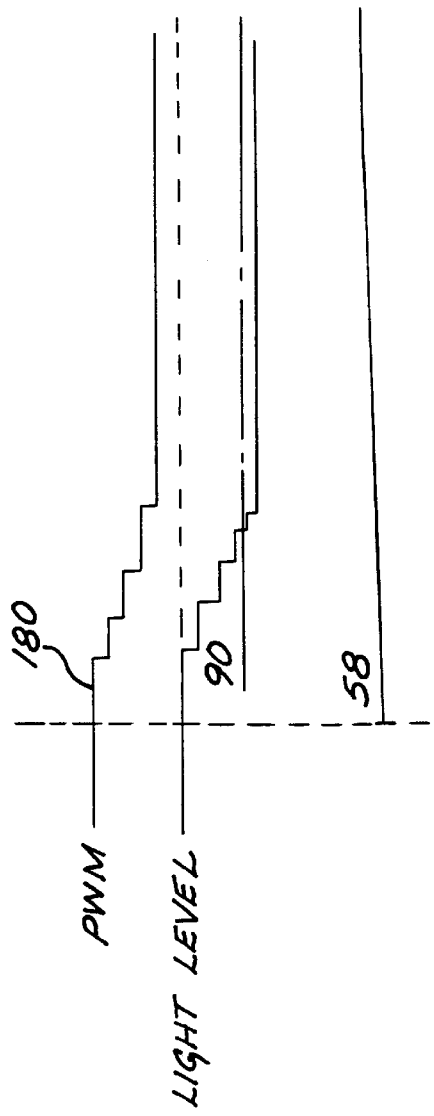
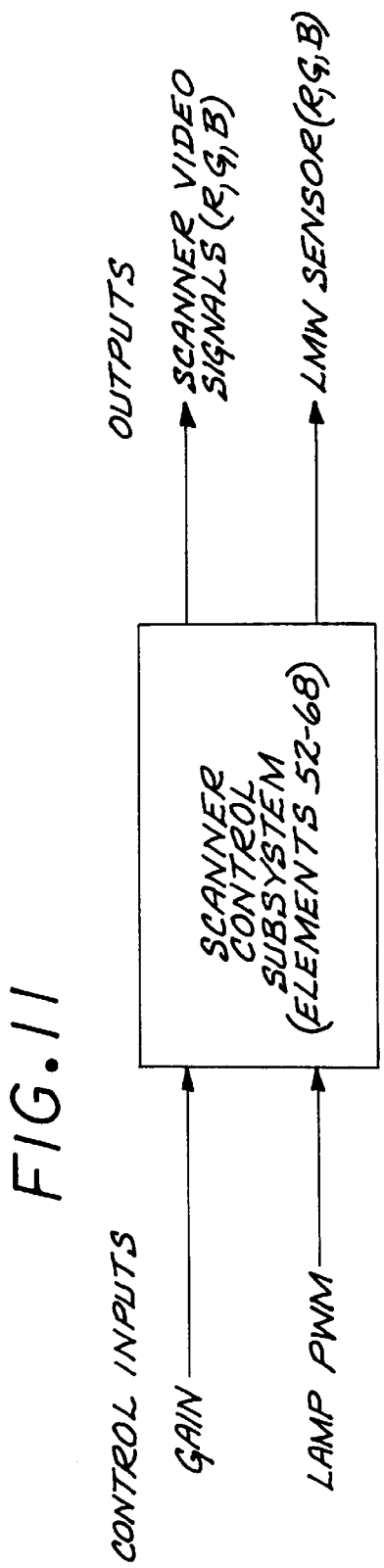

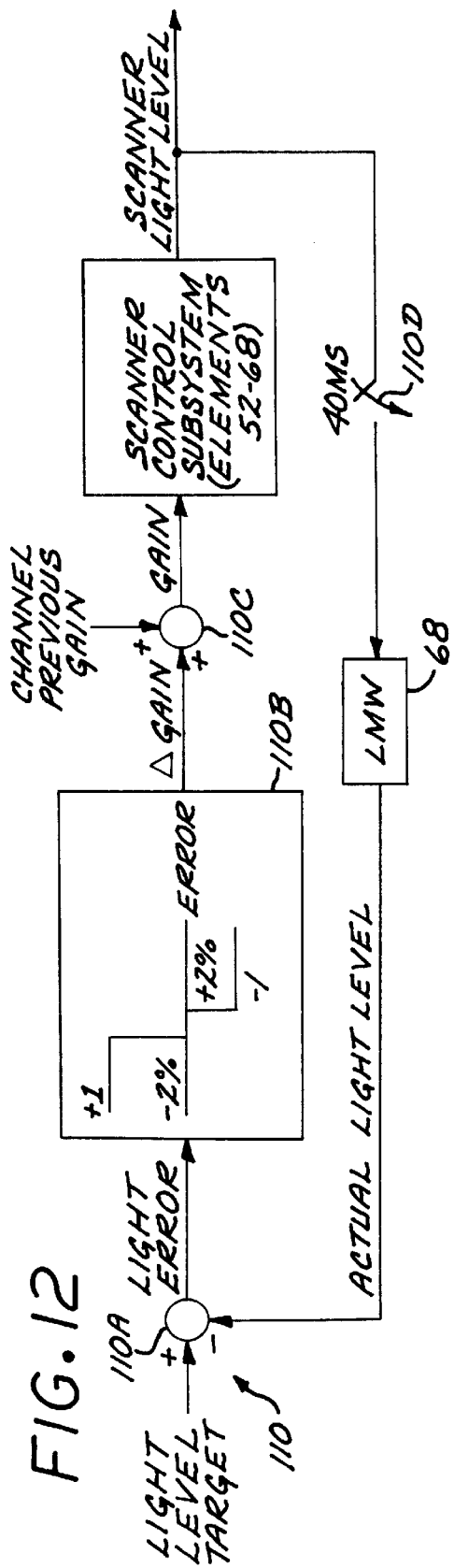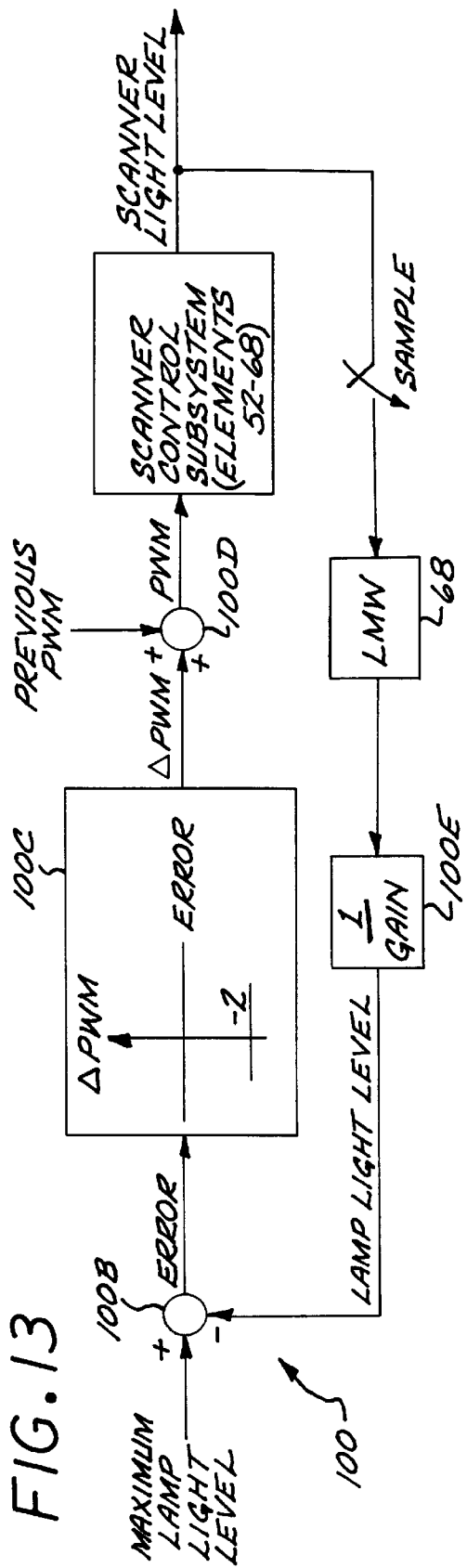

LAMP CONTROL SCHEME FOR RAPID WARMUP OF FLUORESCENT LAMP IN OFFICE EQUIPMENT

TECHNICAL FIELD OF THE INVENTION

The present invention relates to office equipment such as scanners and photocopiers which utilize fluorescent lamps, and more particularly to a technique for rapid warm-up of these lamps.

BACKGROUND OF THE INVENTION

Scanners, copiers, and other office equipment using cold cathode fluorescent lamps (CCFL) take a long time for the bulb to warm up. This warmup time is the time required to achieve an acceptable light level and stability for the purpose of acquiring a good quality scan. Slow warmup is an inherent problem with CCFLs because they contain mercury. At room temperature, much of the mercury is in liquid state, and it must first be vaporized before it can contribute to the light generation process.

A common approach is to wait 1–3 minutes for the lamp to completely warmup before use. However, customers are dissatisfied with this long wait. Another approach is to leave the lamp on all the time. However, this will consume the lamp's useful life in only 1 to 2 years, requiring costly repair and downtime.

A new method described here has been shown to minimize the impact of warmup time on the customer, while maintaining long lamp life. This method assures that the customer will wait only the minimum time necessary for the bulb to warmup and achieve a good quality image.

SUMMARY OF THE INVENTION

A lamp control scheme for rapid warmup of a cold cathode fluorescent lamp, to minimize the warmup time while maintaining long lamp service light. The lamp is over-driven with high current for up to a predetermined time limit to accelerate mercury vaporization. The drive current is then reduced to a normal level. The scanner light output is monitored by a sensor circuit, and the system waits until the light output exceeds a minimum output and the light profile is sufficiently stable. The scanner is then calibrated to a white reference strip, and the closed loop control of the signal level is activated. The scan or copy process is now performed, and the light level control is deactivated as needed. Thereafter, between uses the lower lamp current is 40% of normal level to keep the lamp warm while extending the life of the product. If the product has not been used in a long time, the lamp is turned off.

BRIEF DESCRIPTION OF THE DRAWING

These and other features and advantages of the present invention will become more apparent from the following detailed description of an exemplary embodiment thereof, as illustrated in the accompanying drawings, in which:

FIG. 2A is a bottom view representation of the bottom of the scanner glass comprising the system of FIG. 1, showing the scan area and white calibration strips.

FIG. 2B is an enlarged view of a portion of the scanner glass, showing the scanner unit comprising the lamp and sensor.

FIG. 10 illustrates a hot start of the lamp warm up.

FIG. 11 is a functional block diagram of the scanner control subsystem inputs and outputs.

FIG. 12 is a functional block diagram of the gain controller.

FIG. 13 is a functional block diagram of the lamp controller.

DETAILED DESCRIPTION OF THE PREFERRED EMBODIMENT

Office equipment such as a scanner uses a cold cathode fluorescent lamp (CCFL) for illumination. While these bulbs are bright, inexpensive, and reliable (long life), they also have one major disadvantage; they take a long time to warm up. This warmup time is the time required to achieve an acceptable light level and stability for the purpose of acquiring a good quality scan.

In accordance with the invention, a lamp management system is designed to improve on this shortcoming. Techniques are employed to minimize the warmup time experienced by the scanner user. These techniques include high voltage overdrive during early warmup, closed loop light level control, and bulb warming during standby periods.

Figure 1:
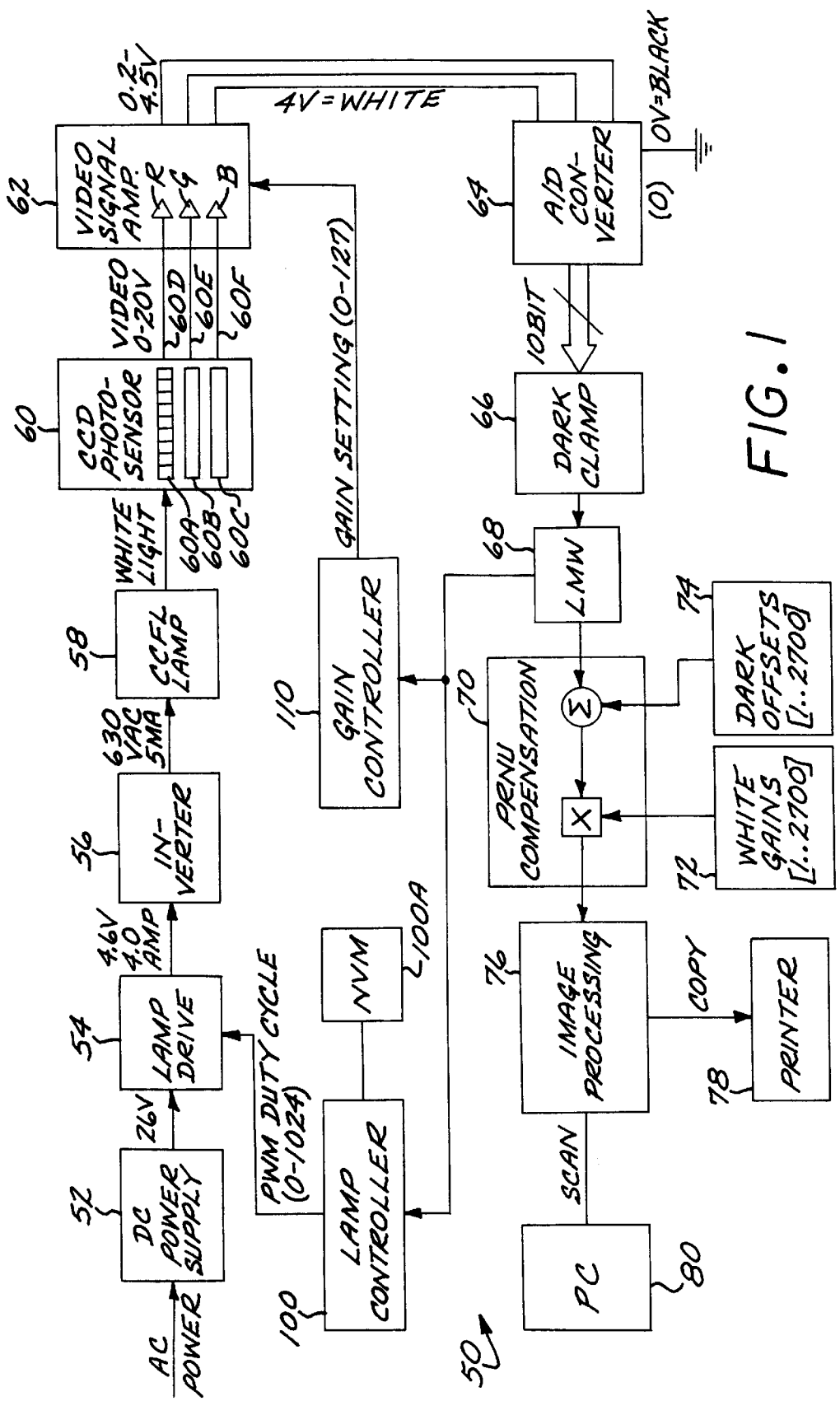
FIG. 1 is a schematic block diagram of an office system 50 embodying the invention.

FIG. 1 is a schematic block diagram of an office system 50 embodying the invention. This system includes the functions of a color scanner, a printer and a personal computer. The system includes a DC power supply 52 which converts AC power to DC at 26V, for this exemplary embodiment. The DC power is provided to the lamp driver 54, which pulse width modulates the DC signal, with a duty cycle determined by the control signal provided by the lamp controller 100. This control signal is a digital control signal in this example, and can have a digital value from 0–1024. The lamp driver output is connected to an inverter 56, which upconverts the DC pulse width modulated signal provided by the lamp driver to a high AC voltage (630 Vac in this exemplary embodiment). The inverter output signal in turn drives the CCFL lamp 58.

The lamp 58 generates white light in response to the power provided by the inverter, which is directed onto the surface of the document or image to be scanned. The reflection from this surface impinges on the CCD photosensor 60, which is a three channel device in this exemplary embodiment, i.e. with red, green and blue channels. The photosensor 60 includes a first linear array 60A of photosensitive pixels sensitive to red light, a second linear array 60B of photosensitive pixels sensitive to green light, and a third linear array 60C of photosensitive pixels sensitive to blue light. The lateral extent of the document to be scanned is imaged on the arrays 60A–60C. Apparatus (not shown in FIG. 1) provides relative motion between the document to be scanned and the photosensor 60 so that the entire document is scanned in successive swaths or lines. This apparatus can take the form of a carriage for moving the sensor array past a fixed document, a document advancing apparatus for moving the document past a stationary photosensor array, or some combination of movement of both the photosensor array and the document. In this exemplary embodiment, the document is positioned on a scanner glass, and the photosensor array is moved along a scan axis transverse to the axis of the linear photosensor arrays.

The scanner photosensor 60 produces an analog output for each of the three channels, in the form of video signals 60D, 60E and 60F, for each channel. These video channel signals are passed through a three channel video amplifier 62, which boosts the voltage level of the video signals from the 0–2.0 volt range to the 0.2–4.5 volt range. The amplified signals are converted to digital form by three channel A/D converter 64, and the resultant digital signals are passed through a dark clamp 66 and light monitor window (LMW) function 68 to the PRNU compensation function 70. LMW function 68 represents the output of a group of array pixels, for each channel of the photosensor, which receives light from a reference position on the lamp. The values of these reference pixels are used by controller 100 and 110, as described below. The output signals represent the scanner output signals, and are provided to image processing function 76 for image processing and subsequent use by a personal computer 89, in the case of scanning, or printer 78, in the case where the image scanned is to be copied by printer 78. of course, the scanner output signals could be used for other functions, e.g. by a facsimile/modem unit.

The PWM of the lamp driver 54 is controlled by the lamp controller 100. The gain setting of the video amplifier 62 is controlled by the gain controller 110. Both controllers 100 and 110 receive data from the LMW function 68.

FIG. 2A shows a bottom view representation of the bottom of the scanner glass 120, showing the scan area encircled by phantom line 122. Both the lamp and the photosensitive sensor are positioned adjacent the underside of the glass, and are moved together as a unit 59 along the axis 132. A calibration strip 124 of white paint on the glass is disposed along and just outside of a transverse edge 122A of the scan area 122. Region 128 on the white paint indicates the area of the white paint viewed by the sensor light monitor window pixels. A servo strip 130 of white paint is disposed along the longitudinal edge 122B of the glass. The calibration strip 124 is used in the initial PRNU calibration of the system, with scanning commencing from the edge 122A, and the lamp/sensor unit moving toward edge 122C as scanning of the document proceeds. As scanning of the document proceeds, the sensor light monitor pixels view the servo strip 130, to provide continuous white calibration data during the scanning process.

It will be appreciated that the white strip 124 and the servo strip 130 can be formed by white paint, a label, plastic strip, or other substance or device that has consistent properties of color reflectance.

FIG. 2B is an enlarged view of a portion of the scanner glass 120, showing the scanner unit 59 comprising the lamp 58 and sensor 60, the white strip 124 and servo strip 130. The sensor arrays 60A, 60B and 60C include a group of light monitor window pixels 60LMW along the left end thereof, which are assigned the task of monitoring reflections from white paint, for use in calibration and gain adjustment both during PRNU and during scanning of a document 10 positioned on the scanner glass.

Figure 3:
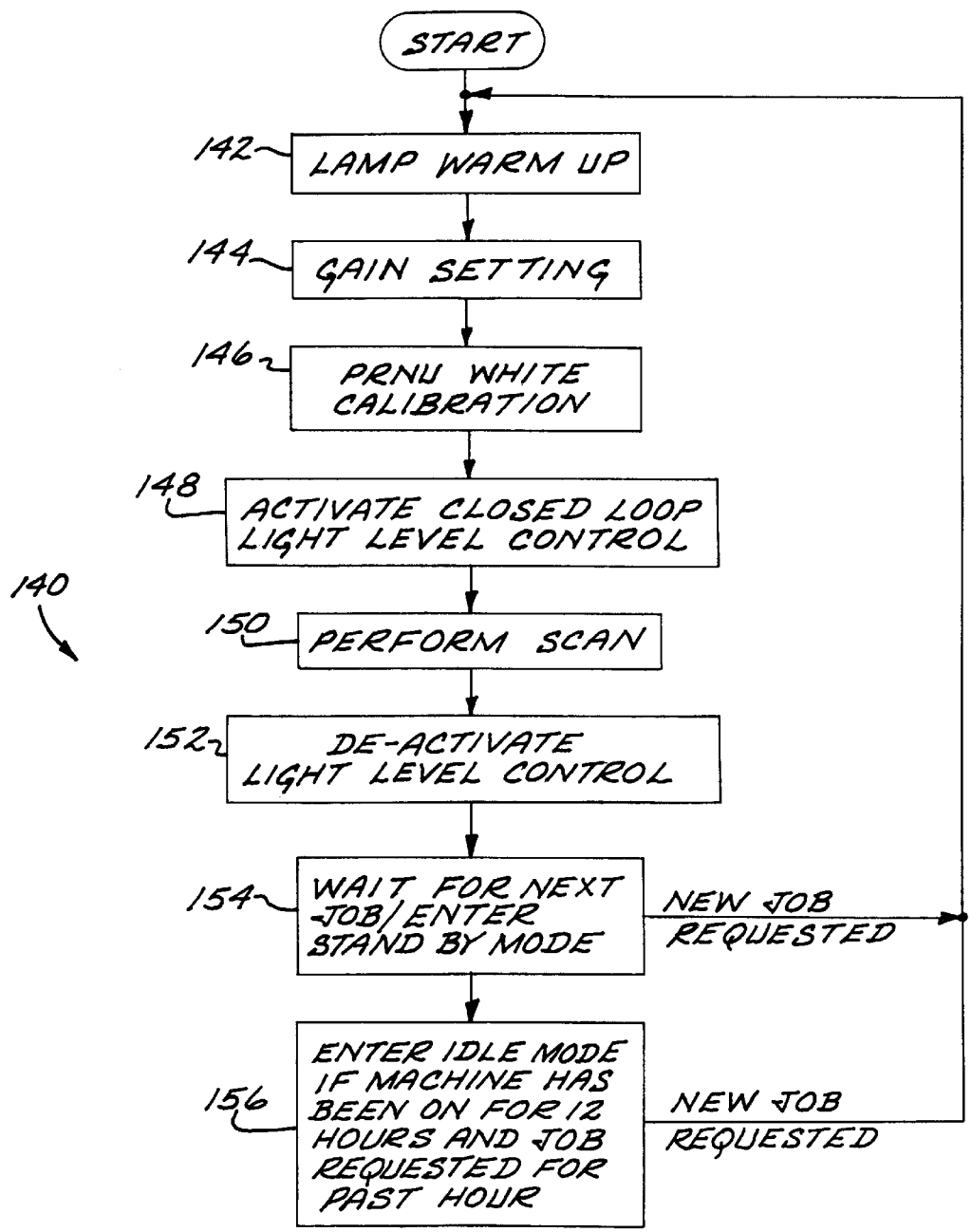
FIG. 3 is a simplified flow diagram illustrating the scan operation of the system of FIG. 1.

FIG. 3 is a simplified flow diagram illustrative of a scan method employing a lamp warmup and control technique in accordance with the invention. Upon commencement of a scan process, typically initiated by the user through front panel controls after placing the document to be scanned on the glass 120 and closing the cover, the lamp warmup algorithm 142 is initiated.

Upon completion of the algorithm 142, the amplifier 62 gains are set at step 144. During the lamp warmup algorithm 142, all amplifier 62 gains were set to a fixed, predetermined value, e.g. 2. The signal levels out of the photosensor channels, for an exemplary sensor unit employed in this embodiment, range from 0–2.0V. Now, once the lamp has been warmed up, the gains of the video amplifier 62 are set to provide a crude scaling of the signal amplitudes to provide a 4V signal level for the pixel of each array 60A–60C having the highest magnitude.

A photo response non-uniformity (PRNU) white calibration process 146 is next performed; such white calibration processes are known in the art, and are used to adjust the gains applied by white gain unit 72 for each pixel of each array 60A–60C. Thus, in the example in which each array has 2700 pixels, there will be found 2700 gain settings to be applied to corresponding pixels for each array 60A–60C in order to compensate for sensitivity non-uniformities in the sensor pixels. A scan is also performed with the lamp 58 off to determine the dark offset values 74 to be subtracted from each corresponding pixel value during scanning operations.

At step 148, the closed loop light level control is activated. As will be described in further detail, this process employs data obtained from the LMW pixels during scanning to adjust the gains of amplifier 62 on the fly to adjust for changes in light intensity produced by the lamp. The scan process is started at step 150. Upon completion of the scan, the closed loop light level control is deactivated (step 152).

At step 154, the system waits for a predetermined time interval, say 30 seconds, for the next job with the lamp driven at the same level as for the prior scan. If the interval elapses before a new job is requested, the system is put into the standby mode, with power reduced to a 40% drive level, to await the next job. The system will remain in the standby mode for a variable period of time, after which, if no further jobs are requested, the system will enter (step 156) an idle mode with the lamp off. The variable period of time is dependent on the total time the system has been powered up. The system will remain in the standby mode for a period which does not exceed 12 hours from system power up. Once the 12 hour period has elapsed, the system either enters the idle mode, or if another job has been requested, will remain in the standby mode for no longer than one hour after the last job was completed.

Figure 4:
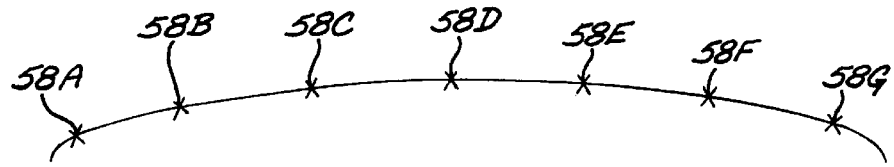
FIG. 4 shows an exemplary bulb intensity curve for the lamp, with seven monitoring points along the longitudinal extent of the bulb active area.

The lamp warm-up algorithm 142 embodied by the lamp controller 100 drives the lamp 58 to a predetermined light level, and then waits for the lamp output light intensity curve as measured by the photosensor 60 to stabilize. FIG. 4 shows an exemplary bulb intensity curve for the lamp 58, with seven monitored points 58A–58G along the longitudinal extent of the bulb active area. These monitoring points are monitored by corresponding sets of pixels of each of the three channels of the photosensor 60, while the lamp/sensor unit is positioned under the white strip 124 above the top edge of the scan area. For example, the first 16 pixels of each photosensor array are used to measure the light level for the light monitoring window 128, which is the first point 58A. Other groups of pixels spaced along the longitudinal extent of the arrays are used to measure the light intensity at the other six monitoring points 58B–58G of the lamp 58.

The algorithm 142 uses light level feedback from the CCD photosensor 60 to determine when the lamp is ready to scan. Two conditions must be satisfied;

1) A minimum light level has been achieved (e.g., greater than or equal to a light value of 58 out of a maximum 255 for this exemplary embodiment, and where 90 is deemed a maximum non-saturated value). For this case, the light value of 58 is the maximum light value at any of the seven monitoring locations, and in any of the three channels (RGB).

2) The bulb light intensity profile (shape) has stabilized (within 12.5%).

Both criteria must be satisfied before the system can exit lamp warmup 142. The bulb 58 can pass the profile stability criteria in either of two ways;

1) Match a "stable" profile stored in non-volatile memory (NVM) 100 A previously. The current light ratios of all seven monitored points (relative to the light level measured at LMW 128) must fall within 12.5% of the stored ratios in all 3 channels. The stable profile was stored the last time the machine 50 entered a standby mode.

2) Meet a slowly-changing-shape criteria using only data from the "current" warmup. This is essentially a derivative test, requiring that the rate of change of the shape as measured at points 58A–58G is less than 3% over the last 7 seconds (14 samples) in this exemplary embodiment.

Essentially, both stability tests are running in parallel. Whenever either of the two finish, the stability criteria is satisfied.

The time needed to warm-up the lamp will vary widely, depending on the characteristics of a particular bulb and how cold it is. However, this method minimizes the time necessary to warm up the lamp.

Figure 5:
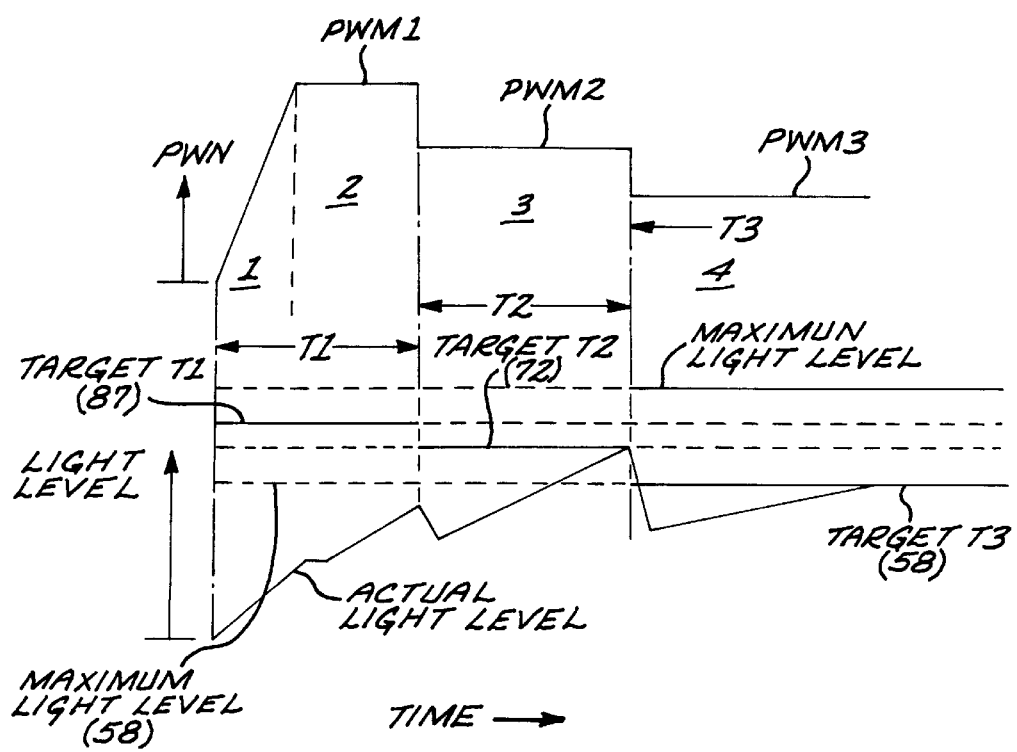
FIG. 5 illustrates generally the control of the lamp PWM and resulting bulb light level as a function of time during the lamp warm up algorithm.

FIG. 5 illustrates the bulb warmup pulse width modulation (PWM) drive and the light level of the lamp 58 as measured by the photosensor 60. Upon start of the warmup algorithm, the PWM is rapidly ramped up from a low start level of 180 to a high power setting at PWM1=300 during time T1. A typical cold start begins by overdriving the bulb inverter to 7.5V (about 11 ma bulb current) for up to 12 seconds to accelerate mercury vaporization. The time at this high power setting does not exceed 12 seconds to avoid damage to the inverter 56 or lamp 58. If a minimum light level, say a light value of 87 in this embodiment, has still not been achieved, the lamp PWM is set to a safer overdrive of 5.5V (PWM2=220) until a light level value of 72 is achieved. At this point the lamp controller 100 adjusts the PWM duty cycle to drop the voltage to 4.57V (about 5 mA), which is the typical scan setting, and monitors the bulb light level and shape. When the light level value exceeds 58 and the shape is stable within 12.5%, the lamp passes warmup and the system is ready to proceed. If the light level exceeds the maximum light level value of 90 before the shape stabilizes, the lamp PWM will be lowered to avoid saturation.

If the lamp has not warmed up within 2 minutes, the system will fail and display the "Scan Bulb Failing" message on the front panel of the system.

The lamp intensity shape is considered stable when the ratio of the intensity of each light level test point (58B–58G) to the intensity at the LMW point 58A is stable. The ratio at a given test point is considered stable if it has not changed by more than 3.00% since the ratio calculated 14 samples ago, or it is within 12.50% of the ratio saved in memory from a stable curve. The stable curve values are found/stored each time the bulb system transitions to the standby mode. The ratios are calculated as follows:

Ratio (for each test point 58B–58G)=(Test Point's light value)/(LMW light value at point 58A), where the test point light value is an average of 32 pixels. (In this exemplary embodiment, the ratio is multiplied by 10,000 to simplify the processor, to avoid having to deal with floating point arithmetic.)

The warmup algorithm performs as follows, with reference to FIG. 5.

Area 1 (FIG. 5). This is the PWM ramp up stage during time T1. The system 50 starts operation with the lamp drive PWM at "pwm start". If "pwm start" is 0, then it starts at the current lamp PWM or "pwm when reach light level" if the lamp is off. The system waits "wait before sample" a given delay interval in tenths of a second (say 0.5 seconds) and then samples the light level at the LMW 128. If the light level is below "light level target max pwm" the PWM is increased by "+pwm per test" and the cycle starts again (wait, sample). This is continued until the light level target is reached or until the "max pwm" level is reached.

Area 2 (FIG. 5). If the "max pwm" level is reached, the unit will continue to sample periodically, but will no longer increase the PWM. The unit will continue at "max pwm" for "max time at pwm" tenths of a second or until the "light level target max pwm" is reached.

Area 3 (FIG. 5). If the "light level target max pwm" is not reached in area 2, the PWM is turned down to "2nd max pwm". The system will continue to test at this level until the "light level target max pwm2" is reached. Since the PWM value during this area is lower than the first, the light level target may be lower. The reason for the light level targets to be above the "min light level" is that the light level drops when the lamp PWM is decreased.

Area 4 (FIG. 5). Once the "light level target" is reached, the PWM is set to "pwm when reach light level" if the current PWM is above this level. The testing continues until the light level is between "min light level" and "max light level" and the lamp shape is stable. If during this time the light level goes above "max light level", the PWM will be decreased by "step stay in range," a predetermined amount. If the light level goes below "min light level" and the PWM is below "pwm when reach light level", the PWM will be increased by "step stay in range," all predetermined parameters.

If the test process has not completed before "max time to warm-up," a predetermined number, in tenths of a second (1200=120 sec) then the unit fails with a lamp failure.

FIGS. 6–10 show exemplary warm up control, depending on the state of the lamp when commencing the warm up algorithm. A cold start lamp warmup will be performed when the lamp was previously off. A warm start will be performed when the lamp was previously set on standby (40% drive). A hot start will be performed when the lamp was previously driven at scanning drive power.

Figure 6:
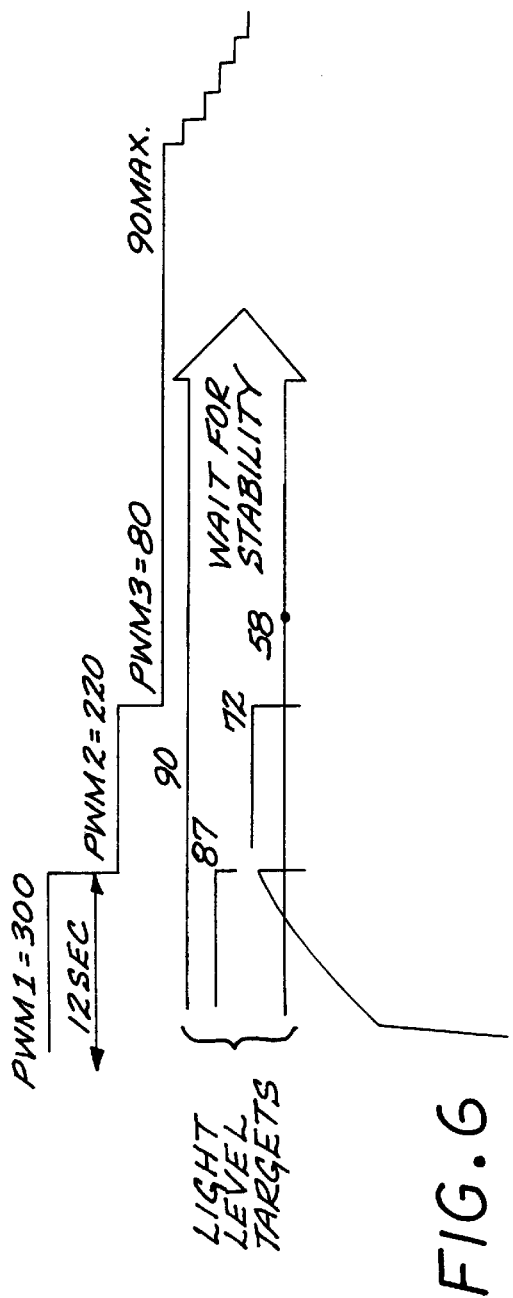
FIG. 6 illustrates an exemplary cold start of the lamp warm up with two-stage overdrive.

FIG. 6 illustrates the cold start situation in which the lamp is cold, and the warm up employs two stage overdrive of the lamp. The first stage of overdrive is the full overdrive, PWM1=300. In this instance, the lamp has not reached the light level targets even at the high overdrive level. At the end of 12 seconds, the overdrive level is reduced to PWM2=220. Once the light level reaches the second stage target (72), the PWM is reduced to 180. Thus, in this case, the first stage of overdrive is at PWM1=300, and the second stage is at PM2=220. The measured light level is shown in FIG. 6, and reaches the light level target (58) after the reduction in the drive to PWM3=180. Now the lamp controller waits for the light stability to meet its stability targets, with the light intensity slowly increasing, and the drive level being incrementally reduced if the light intensity reaches the maximum level (90).

Figure 7:
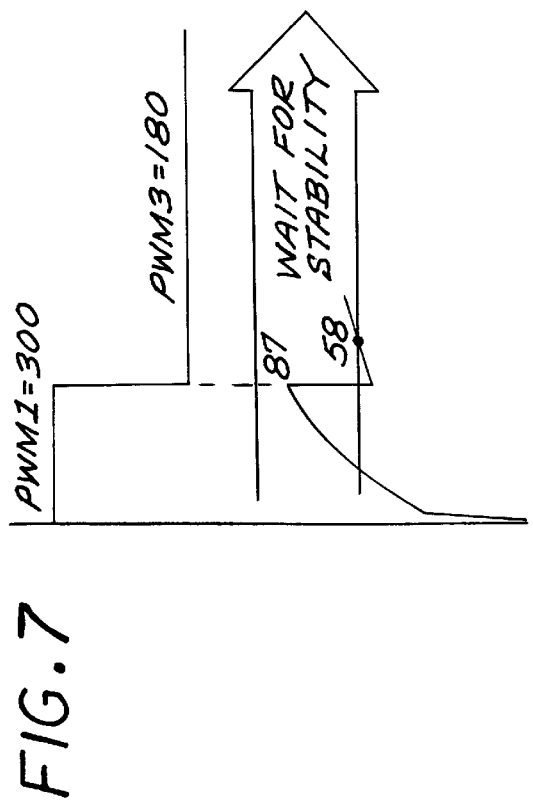
FIG. 7 illustrates an exemplary cold start of the lamp warm up with one stage of overdrive.

FIG. 7 shows the cold start lamp warm up, but in this case, the light intensity target (87) is met prior to expiration of the 12 second interval, and upon reduction of the drive, the lower drive target (58) is also met. In this case, there is no need for the second stage of overdrive at PWM2=220, and so the lamp drive is set to PWM3=180 directly from the PWM1=300 drive level. Here again, after the drive is reduced and the light level target is met, the system awaits lamp intensity stability.

Figure 8:
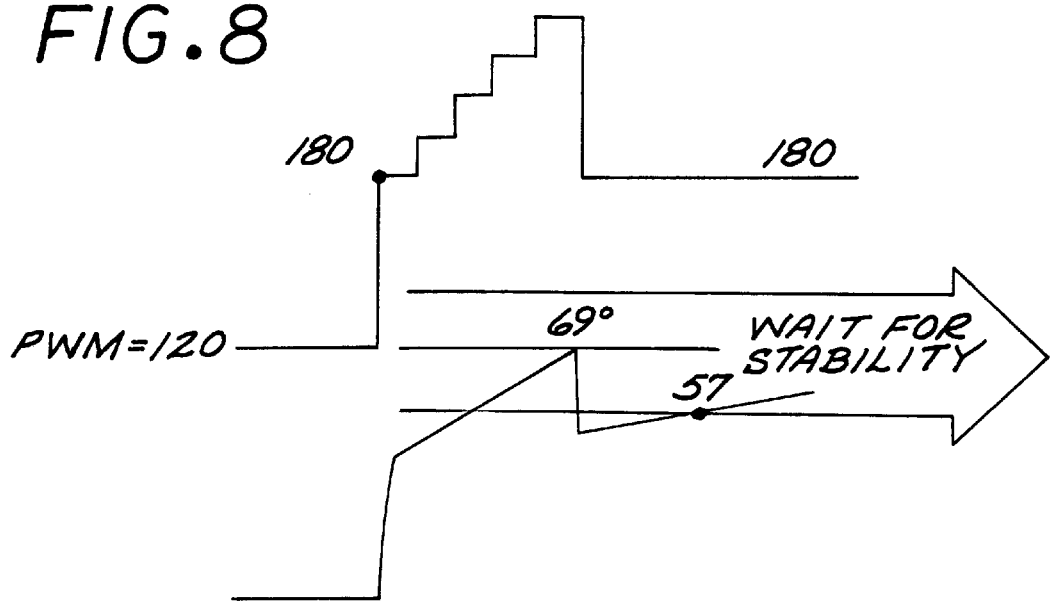
FIG. 8 illustrates a warm start of the lamp warm up with overdrive.

FIG. 8 shows the warm start, where the lamp has been at standby. This shows a ramp step increase in the drive, initially from PWM=120 to PWM=180, and subsequently in smaller increments of 10. This continues until a light value target (69) is reached. The drive is reduced from 220 to 180, and as soon as the target (58) is reached, the system waits for lamp intensity stability to be reached before proceeding.

Figure 9:
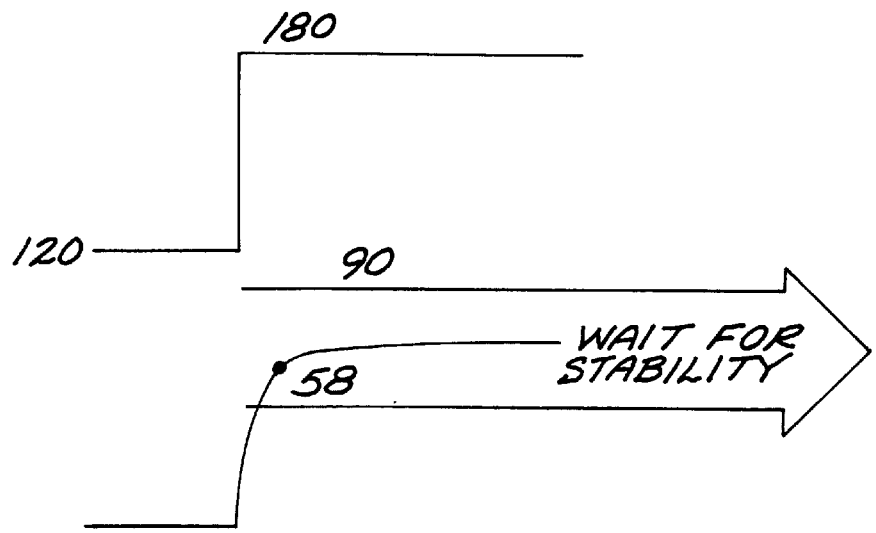
FIG. 9 illustrates a warm start of the lamp warm up with no overdrive.

FIG. 9 shows the warm start when no overdrive is necessary. The drive is stepped from 120 to 180, and reaches the target (58) immediately, so that no overdrive is necessary. The system waits, with the PWM set to 180, for lamp intensity stability. Of course as the lamp intensity increases, the controller 100 will reduce the PWM as needed if the light intensity exceeds the maximum level (90).

FIG. 10 shows the hot start case, where the new job is started with the lamp already driven at the scan level PWM=180. In this exemplary situation, the light level is already at the maximum level (90) and so the lamp PWM is reduced to reduce the lamp output intensity. In this situation, the stability test must also be satisfied, but with a hot lamp, the test may well be satisfied on the first test/sample.

FIG. 10 illustrates the scanner control subsystem comprising the elements 52–68, with the gain command and lamp PWM as its two inputs, and the scanner video signals and LMW sensor signals as its two outputs.

PRNU Calibration (146). A scanner calibration (146) is done at the beginning of each scan or copy job in order to calibrate the scanner to "white". This has been historically called "PRNU" calibration because it is intended to compensate for the Photo Response Non-Uniformity of the CCD. However, it also compensates for other significant nonuniformities in the system, including lamp rolloff at the ends, and off-axis light attenuation through the lens ($\cos^4\theta$ effect). It sets the correct lightness, fine tunes the spectrum, and flattens out the variations across the scan line so a good quality scan can be achieved.

PRNU calibration is performed after lamp warmup, when the lamp's light profile has stabilized. The white scan is performed under the white strip and calibrates the RGB channels to a known, nearly white reference. Scanners can have large manufacturing variations in light level and spectrum, so the scanner depends on the painted white strip as the standard of reference used to calibrate itself to the real world's color space. The color coordinates of the paint must be highly accurate and reproducible. The system calibrates itself to RGB targets that are designed to achieve neutral color balance when scanning Munsel gray targets, and use as much of the dynamic range as possible without saturating on bright whites (L is on the order of 96). After performing PRNU calibration, constants are stored in memory, 10 bits for each pixel, in the range of 1.0 to 2.0 with 1024 steps in between. During a scan or copy, each pixel is individually compensated by multiplying by its corresponding white gain. The white gains flatten the white response profile for each channel (R,G,B).

Lamp stabilization is detected by monitoring the light level at the locations 58A–58G along the lamp 58. The first location is the LMW 128 under the servo strip. Stabilization is accomplished when the remaining 6 locations are changing at the same rate as the intensity at the LMW. During scanning operations, this makes it possible to control the entire lamp by watching the servo strip 130 with the LMW pixels down the page. For example, if the light level increases uniformly by 10% at all locations, this is compensated by turning down the gains at amplifier 62 by 10%. However, if the LMW location intensity increases 10% while the center location increases 30% in intensity, the system is unable to detect or compensate this change in shape during the scan. This is why the lamp warmup routine 142 must assure a stable shape before scanning starts.

Closed Loop Light Control. In order to minimize the scan start time, the system 50 will start scanning before a cold lamp has reached a final light level and spectrum. To maintain uniform lighting and spectrum, the RGB gains at amplifier 62 and the lamp PWM are adjusted on the fly as the scanner unit 59 scans down the page. The controllers 100 and 110 get feedback by measuring the light level in the LMW 128, a group of 16 pixels for each array that reports the average RGB light levels. The LMW monitors the light level on the servo strip 130, the thin white strip of paint that extends the length of the scanner glass 120.

During a scan, the controllers 110 and 110 read the LMW intensity at LMW function 68, and adjusts the amplifier 62 gains and lamp PWM accordingly. In this exemplary embodiment, the controllers take action every 10 scan line interrupts (40 msec). A filter is used to reduce the effect of electrical and optical noise. It stores 9 samples, throws out the high and low, and averages the remaining 7 scan lines.

Gain Control During Scan Operation. There is a separate gain controller for each channel; FIG. 12 is a functional block diagram of an exemplary one of these gain controllers. The controller 110 operation of FIG. 12 occurs only during scanning operation. The controller 110 holds the light levels to RGB targets. These targets come from the PRNU white scan process 146, using the LMW pixels. Given these targets, the controller 110 monitors the RGB levels and makes an adjustment if the light levels drift out of a plus/minus 2% tolerance window. Adjustments are limited to 1 gain count or 1 lamp PWM count per controller interrupt (10 lines). This limits the size of the correction and reduces the chance of a visible hue shift occurring suddenly on the scan or copy.

Figure 14:
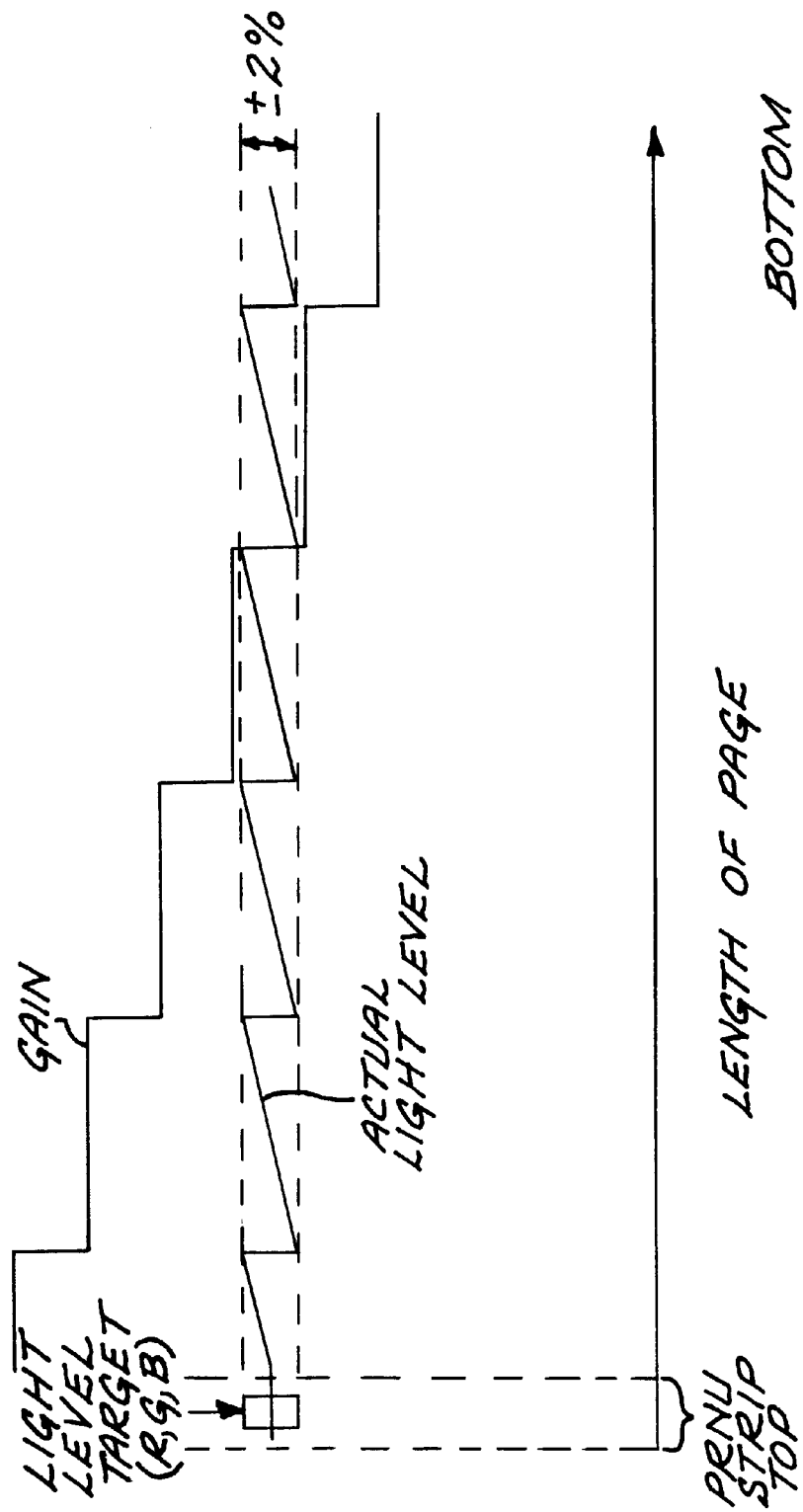
FIG. 14 illustrates the gain control and actual light level during scanning operations.

As schematically shown in FIG. 12, the controller 110 channels each include a summing node 120 to compare the target against the photosensor intensity level, as measured by the LMW function 68, and generate a light error. The light error is used at function 110B to determine the Again value to change the gain setting at function 110C. The new gain setting is provided to the scanner control subsystem, and particularly amplifier 62, to update the gain every 4 ms, and the resulting light level is read by the LMW function 68 every 40 ms. FIG. 14 illustrates the gain control during scanning.

The controller 110 allows independent control of the gain of the R, G and B channels of the video amplifier 62. The gains can be adjusted up and down, but the lamp PWM can only be turned down. The controller 110 is only active during scans; it is enabled just after PRNU calibration, and is disabled at the bottom of the scan. It is not active during retrace, standby, or idle modes.

Lamp PWM Control During Scan Operation. The lamp controller 100 activates only if one of the signal gains from amplifier 62 drops below a threshold (e.g., gains less than 2.53). This limit is important for two reasons. First, if the gain drops too low, the quantization error of the system increases to the point where a 1 count change produces a visible hue shift in the scan. This gain limit of 2.5 has been empirically established. Second, the gain limit establishes the maximum CCD voltage as approximately 1.5 volts, which corresponds to about 75% of saturation.

In effect, if the lamp 58 gets too bright, the controller 100 will ratchet down the PWM to avoid saturation. For example, suppose the green gain starts the scan at 40, but then drops down to 30 as the lamp warms up. At this point in the scan, the green gain's decent will be limited to 30, and the lamp PWM will be turned down instead. Even though the green gain is locked at this point, the red and blue gains are free to make adjustments to control the spectrum.

In summary, the system allows the scan to start early, before the lamp has reached its steady state light level. As the lamp continues to warm up during the scan, it takes advantage of the increasing light level to improve the signal/noise ratio at the CCD 60. However, it limits the light level to avoid saturating the inputs to the video amplifier or the CCD.

It is important to note that the controller 100 cannot compensate for any change to the lamp profile that occurs after PRNU calibration. This is because the controller can only detect changes in the LMW 128, which is located at one end of the bulb. A global change in light level will be compensated, but any localized change in the lamp's shape will not be compensated. For this reason, the lamp warmup algorithm monitors the lamp profile and will not release the system to scan until the shape has stabilized.

FIG. 13 is a schematic diagram of the controller 100. The maximum lamp light intensity level (90) is compared at node 100B to the actual lamp light level to generate an error signal, used to determine at function 100C the ΔPWM value. The initial PWM value is summed with the ΔPWM value to drive the lamp 58. The resulting sensor intensity level is then read at the LMW every 40 ms, and after normalization by function 100E, the lamp light level is obtained for use at function 100B.

Because the painted white strip 124 is in intimate contact with the glass, a "light pipe effect" occurs when the scanner moves out from underneath the calibration strip 124. As a result, the light level in the LMW drops about 15% gradually during the first ½ inch of the scan. To compensate for the light pipe effect, the LMW reference also drops off at the top of the scan.

While the foregoing embodiment has involved the control of a CCFL, the invention is generally applicable to other types of lamps, particularly those containing mercury which is vaporized to contribute to the light generating process, such as hot cathode fluorescent lamps.

It is a feature of an aspect of the invention that the same sensor array used for normal document scanning operations is also used as a sensor for controlling the drive to the lamp. This simplifies the hardware, since no separate sensor is needed for this function.

It is understood that the above-described embodiments are merely illustrative of the possible specific embodiments which may represent principles of the present invention.

Other arrangements may readily be devised in accordance with these principles by those skilled in the art without departing from the scope and spirit of the invention.

What is claimed is:

1. An image scanning apparatus, comprising:
    a fluorescent lamp for generating illumination light for illuminating an image to be scanned and captured electronically;
    a lamp drive circuit for generating electrical drive signals to operate the lamp;
    a photosensitive array of light sensitive pixels responsive to illumination light for producing electrical signals representative of a light intensity at pixel locations;
    a controller for controlling the lamp drive circuit, said controller adapted to operate in a cold start mode to cause the lamp drive circuit to over-drive the lamp for up to a predetermined time limit to accelerate lamp warmup, the controller responsive to signals from the photosensitive array indicating the intensity of the light produced by the lamp along a lamp longitudinal extent during the cold start mode, said controller adapted to determine when a light output from said lamp exceeds a predetermined minimum output level and when an intensity profile along the lamp longitudinal extent has stabilized, the controller activating image scanning operations only when said light output exceeds said predetermined minimum output level and said intensity profile has stabilized.

2. The apparatus of claim 1, further comprising apparatus for positioning the lamp and photosensitive array at a calibration position so that the array received light energy from the lamp, and wherein the controller causes the positioning apparatus to position the lamp and array at the calibration position during the cold start mode.

3. The apparatus of claim 2 wherein the positioning apparatus includes a carriage holding the lamp and the array as a unit, and apparatus for scanning the carriage along a path of travel to pass the unit along a surface of a media having the image recorded thereon.

4. The apparatus of claim 3 further including a reflective strip positioned at said calibration position to reflect light generated by the lamp onto the array.

5. The apparatus of claim 4 further comprising a transparent plate having a first surface against which said media is placed during scanning operations, and said carriage path of travel is adjacent a second surface of the transparent plate.

6. The apparatus of claim 4 wherein said reflective strip is positioned adjacent a first edge of said media, wherein said lamp and said array are generally parallel to said first edge, and further including a second reflective strip adjacent a margin of said media along a second edge of said media which is transverse to said first edge, said second reflective strip for reflecting light emitted by the lamp at a first region, wherein light monitor window (LMW) pixels of said array are positioned to receive light reflected by the second reflective strip and emitted by the lamp during said cold start mode and during scanning operations and provide electrical signals indicative of an average light level.

7. The apparatus of claim 6 wherein said controller is further responsive to light receive at said LMW pixels during scanning operations to adjust the lamp drive circuit.

8. The apparatus of claim 7 further comprising an adjustable gain amplifier for amplifying the signals produced by the array, and wherein said controller is connected to the amplifier to adjust the gain during scanning operations.

9. The apparatus of claim 1 wherein said photosensitive array is further employed during scanning operations to capture electronically said image.

10. The apparatus of claim 1 wherein said lamp is a cold cathode fluorescent lamp.

11. The apparatus of claim 1 wherein said lamp drive circuit includes a pulse width modulator circuit.

12. The apparatus of claim 1 wherein the photosensitive array includes a first set of pixels responsive to red light, a second set of pixels responsive to blue light, and a third set of pixels responsive to green light.

13. A method for rapid warmup of a fluorescent lamp used as a light source in an image scanning apparatus, comprising a sequence of the following steps:

overdriving the lamp with high current for up to a predetermined time limit to accelerate warmup, and then reducing the current drive;

monitoring the lamp light output with a sensor circuit;

determining from the sensor circuit when a light output intensity exceeds a predetermined minimum output and a light intensity profile along a longitudinal extent of the lamp has stabilized;

using the warmed up lamp in image scanning operations.

14. The method of claim 13 wherein said sensor circuit includes a linear array of light sensitive pixels disposed along a longitudinal extent of said lamp, and said step of monitoring said lamp light output includes monitoring pixels at a plurality of separated locations along a lamp extent, and one of said locations is a reference location.

15. The method of claim 14 wherein said step of determining when the light intensity profile has stabilized includes comparing intensity levels measured at said plurality of separated locations to a reference intensity measured at said reference location and determining whether each ratio is stable.

16. The method of claim 15 wherein said step of determining whether each ratio is stable includes comparing each said ratio to a corresponding ratio stored in memory from a stable lamp and determining whether each said ratio is within a predetermined threshold ratio value of said corresponding ratio.

17. The method of claim 15 wherein said step of determining whether each ratio is stable includes comparing each said ratio to a corresponding ratio calculated previously and determining that each said ratio has changed by no more than a predetermined amount from said corresponding ratio.

18. The method of claim 15 wherein said step of determining whether each ratio is stable includes a time derivative test of each said ratio.

19. The method if claim 13 wherein the sensor circuit is also used during scanning operations to sense light representative of an image scanned by the lamp.

20. The method of claim 13 wherein the sensor circuit is a color sensor circuit with red, green and blue channels.

* * * * *